United States Patent
McRae

(10) Patent No.: US 12,112,606 B2
(45) Date of Patent: Oct. 8, 2024

(54) SMART HOME SYSTEM AND METHOD HAVING PLURAL USER INTERFACE MODES

(71) Applicant: Arlo Technologies, Inc., Carlsbad, CA (US)

(72) Inventor: Matthew McRae, Laguna Niguel, CA (US)

(73) Assignee: Arlo Technologies, Inc., Carlsbad, CA (US)

( * ) Notice: Subject to any disclaimer, the term of this patent is extended or adjusted under 35 U.S.C. 154(b) by 0 days.

(21) Appl. No.: 17/852,620

(22) Filed: Jun. 29, 2022

(65) Prior Publication Data

US 2023/0005346 A1    Jan. 5, 2023

Related U.S. Application Data

(60) Provisional application No. 63/216,771, filed on Jun. 30, 2021.

(51) Int. Cl.
| | | |
|---|---|---|
| G08B 13/19 | (2006.01) | |
| G08B 13/196 | (2006.01) | |
| H04L 12/28 | (2006.01) | |

(52) U.S. Cl.
CPC . *G08B 13/19682* (2013.01); *G08B 13/19689* (2013.01); *H04L 12/282* (2013.01)

(58) Field of Classification Search
CPC ........ G08B 13/19682; G08B 13/19689; H04L 12/282
See application file for complete search history.

(56) References Cited

U.S. PATENT DOCUMENTS

| | | | | |
|---|---|---|---|---|
| 10,657,784 | B1* | 5/2020 | Gordon | G08B 13/1966 |
| 2010/0071054 | A1* | 3/2010 | Hart | H04L 63/1416 |
| | | | | 713/153 |
| 2011/0084913 | A1* | 4/2011 | Wirtanen | G06F 3/0346 |
| | | | | 345/173 |
| 2012/0072835 | A1* | 3/2012 | Gross | G06Q 10/10 |
| | | | | 715/243 |
| 2019/0200872 | A1* | 7/2019 | Matsuoka | A61B 5/0013 |
| 2019/0356505 | A1* | 11/2019 | Madden | H04L 12/2834 |
| 2020/0215919 | A1* | 7/2020 | Laine | B60K 35/10 |
| 2022/0291829 | A1* | 9/2022 | Kim | G06F 1/165 |
| 2022/0294992 | A1* | 9/2022 | Manzari | H04N 23/633 |
| 2023/0005346 | A1* | 1/2023 | McRae | H04L 12/2816 |

FOREIGN PATENT DOCUMENTS

EP        2555177        2/2013

* cited by examiner

*Primary Examiner* — David E Choi
(74) *Attorney, Agent, or Firm* — Boyle Frederickson S.C.

(57) ABSTRACT

A smart home system such a smart security system includes at least one controlled module capable of performing monitoring and/or control functions, and a controller that is in communication with the controlled module and a user device such as a smart phone or computer tablet. The system is operable to configure the user device with a first set of user interfaces and control functionalities in response to selection of a first operating mode, and to configure the user device with a second set of user interfaces and control functionalities in response to selection of a second operating mode. The first mode may be a master-controller mode in which the user device's graphics are displayed in portrait orientation, and the second mode may be a panel mode in which the user device's graphics are displayed in landscape orientation.

19 Claims, 4 Drawing Sheets

SMART HOME SYSTEM AND METHOD HAVING PLURAL USER INTERFACE MODES

CROSS-REFERENCE TO A RELATED APPLICATION

This application claims the benefit of provisional patent application U.S. App. No. 63/216,771, filed on Jun. 30, 2021 and entitled "Smart Home System and Method Having Plural User Interface Modes", the entire contents of which are hereby expressly incorporated by reference into the present application.

BACKGROUND OF THE INVENTION

1. Field of the Invention

The present invention relates to a smart home system such as a smart security system, and more particularly, to a smart home system in which a user device can interface with the system in different modes, with different graphical arrangements and functionalities being associated with each mode. The invention additionally relates to a method of using such user device.

2. Discussion of the Related Art

Smart home systems are used increasingly widely in residential, commercial, and other business settings. The typical "smart home" has one or more controlled modules that are controlled remotely by a user interfacing with the system via a user device such as a smart phone or computer tablet. Controlled modules include, for example, a lighting system, a HVAC system, or a monitoring or "smart security" system. The controlled modules of the typical smart security system include a number of cameras. Each camera is coupled to or integrated with electronic sensors to detect one or more triggering events, such as a detected motion, to initiate image capturing and recording of an area once a triggering event has occurred. Video cameras have also been connected to computers with network access to allow a user to remotely monitor an area with a user-operated monitoring device such as a PC or laptop computer, a smart phone, or a tablet computer. The controlled modules may also include other sensors and/or detectors, such as one or more smoke detectors. The controlled modules communicate wirelessly with a hub or base station of the system in a wireless local area network (WLAN), and the WLAN communicates via a wide area network (WAN) with the user device and, typically, an external server such as a cloud-based server.

Smart security system interfaces and other smart home system interfaces are designed for use a single user. They can provide a relatively large number of intricate graphical elements on their displays to permit control functions usually required by a system administrator who may need to perform functions such as monitoring system status, reconfiguring the system or its components, and accessing historical information such as archived video footage. The interfaces often are specifically configured for display on mobile phones or tablets with an assumption that the user is the only person who will interact with the system via that device and that the user is holding the device very close to their face. They also typically assume that the user knows the system and its interfaces well.

However, smart security systems and some other smart home systems often need a home-based interface device that provides limited access to the system to a larger number of users for limited tasks, such as arming or disarming the system and viewing live video stream. These devices typically are mounted on a wall or table near an entrance door. They have a visual display that is designed to be viewed and accessed from arm's length. Unless their displays are undesirably large, their graphics are limited in nature and intricacy to permit easy viewing from a distance of 2-3 feet away. They also exhibit limited or no variability, and are used primarily for arming or disarming the system, monitoring triggering events, etc. These devices quickly become obsolete, are hard to update, and are prohibitively expensive when produced in the relatively low volumes the market demands.

The need therefore has arisen to provide a smart home system, such as a smart security system, that eliminates the need for a specialized or dedicated interface device for relatively simple controls such as system arming and disarming.

The need additionally has arisen to provide a smart home system having an interface device that can be easily updated or modified to accommodate changes in the system as a whole.

SUMMARY OF THE INVENTION

In accordance with a first aspect of the invention, these needs are met by providing a smart home system comprising at least one controlled module capable of performing monitoring and/or control functions, and a controller that is in communication with the controlled module and a user device. The controller executes a program, stored in a non-transitory memory, to 1) in response to selection of a first operating mode of the user device, configure the user device with a first set of user interfaces and control functionalities, and 2) in response to selection of a second operating mode of the user device, configure the user device with a second set of user interfaces and control functionalities.

In one configuration that is particularly useful with a home-based smart security system, the first mode is a master-controller mode and the second mode is a panel mode. In this case, the controller is configured to execute a program to cause the user device to display a greater number of graphical elements and to have, at least in some respects, enhanced functionality when operating in the master-controller mode than when operating in the panel mode. For example, the controller may be configured to execute the program to cause the user device, when operating in the panel mode, to have no or reduced ability to permit the user to change security settings, reduced or barred control access to one or more controlled modules, different display power and/or sleep settings, and/or different monitoring characteristics.

In order to permit the user device to better-mimic or emulate a typical wall-mounted control panel, the controller may be configured to execute the program to display graphics on a display of the user device in portrait orientation when the user device is configured to operate in the first mode and in landscape orientation when the user device is configured to operate in the second mode.

Also disclosed is a method for controlling a system having one or more of the characteristics described herein. The method includes selecting one of first and second operating modes of the user device. In response to selecting the first operating mode, the method involves configuring the user device with a first set of user interfaces and control functionalities. In response to selecting the second operating mode, the method involves configuring the user device with a second set of user interfaces and control functionalities.

The selection may be performed manually by entering a command on the user device. Alternatively, the selection is performed automatically upon occurrence of a triggering event. For example, the triggering event may comprise detection of the user device being positioned in or rotating to a specified orientation, detection of the user device being plugged into or otherwise interfacing with a wall or table mount, and/or detection by a controlled module of a specific event.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION

Figure 1:
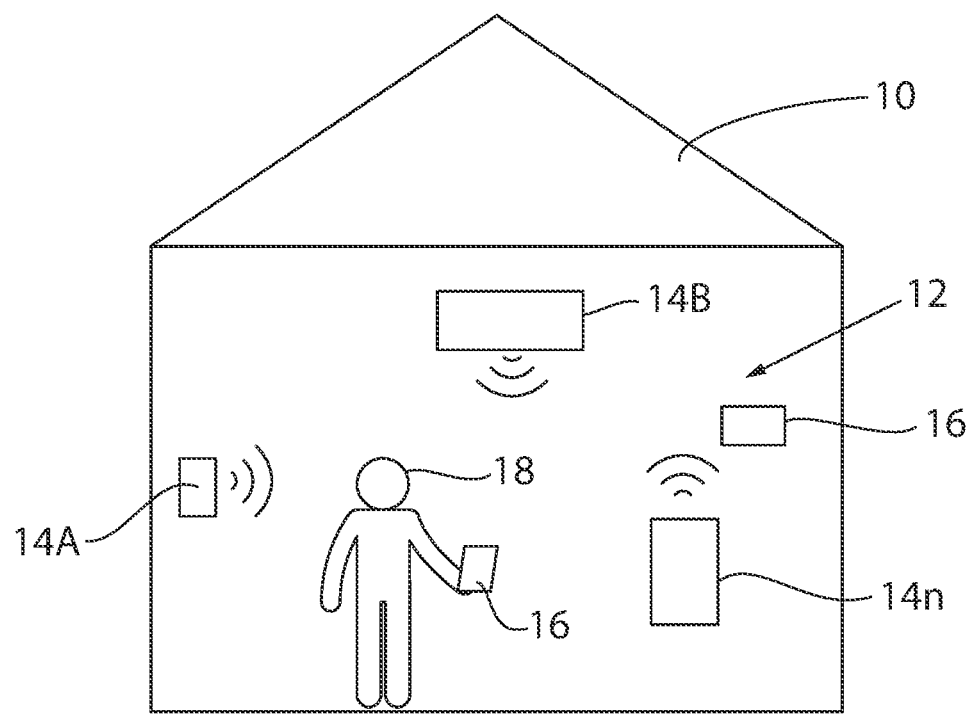
FIG. 1 is a schematic view of a home provided with a smart home system constructed in accordance with the present invention.

Referring now to FIG. 1, a "smart home" 10 is provided with a smart home system 12 that includes a number of controlled modules 14A, 14B, . . . 14n that exchange information with one or more user devices 16 accessible by a human user 18. The smart home 10 may be any residence, business, or defined interior or exterior area having one or a number of controlled modules. Each controlled module 14A-14n may be any of a number of controllable services, devices, or systems; such as a smart button, a smart light or smart lighting system, or a thermostat of an HVAC system. Each controlled module 14A-14n also could be a monitoring device, such as: a smoke detector or motion sensor, that is standalone or is integrated at least in part into another device; an alarm that that also may be standalone or partially or wholly integrated into another device; and/or an imaging device having one or more cameras. If the controlled modules of the system are limited or primarily limited to such monitoring devices, the system can be thought of as a smart security system.

Figure 2:
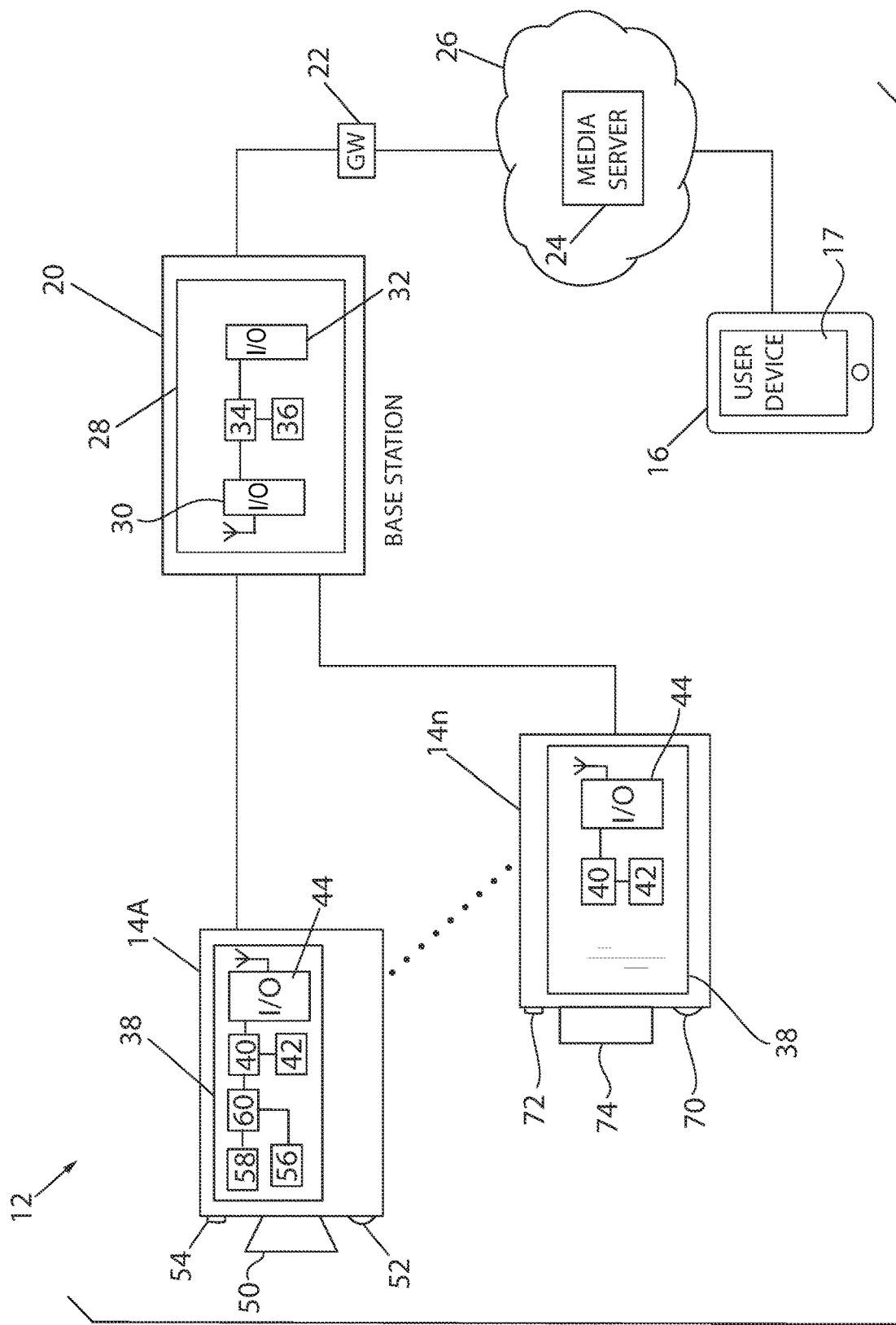
FIG. 2 is a schematic view of the smart home system of FIG. 1.

The user device 16 may be, for example, a smart phone, a computer tablet, a desk top computer, or a laptop computer. Each user device 16 includes a display that typically includes both an audio display and a video display, internal computing and storage capabilities, and a program or application servicing as a user interface with the remainder of the system 12. In the case of a smart phone or a tablet, the display may include a generally rectangular touch screen 17 (FIGS. 2-3B). The screen 17 serves as a graphical user interface (GUI) on which symbols, icons, or other graphical elements are displayed. At least some of these graphical elements may serve as GUI elements that are responsive to user interaction to perform a task. The number, nature, orientation, and arrangement of the graphical elements that are displayed my vary depending on, most notably, whether the user device is operating in master-controller mode or panel mode.

Referring now to FIG. 2, the smart home system 12 is shown in greater detail. Each controlled module 14A-14n communicates with a base station 20 through a network such as a private Wireless Local Area Network (WLAN), hosted by the base station 20 operating as an access point. One such network is an IEEE 802.11 network. The WLAN communicates with a Wide Area Network (WAN) via a gateway router 22. The WAN includes an external server 24 which communicates wirelessly with the user devices 16 and the base station 20. The server 24 may be a cloud-based server 24 located in the cloud 26.

Still referring to FIG. 2, the hub or base station 20 can include base station electronic circuitry 28 including a first wireless I/O communication device or radio 30 for communicating with the controlled devices 14A-14n over the WLAN, a second wired or wireless I/O communication device or radio 32 for accessing the Wide Area Network (WAN) via the gateway router 22, a processor 34 and/or a non-transitory memory storage 36, among other things. It should be apparent that "circuitry" in this regard can comprise hardware, firmware, software, or any combination thereof. The base station 20 could be an Arlo® base station, available on a stand-alone basis or as part of any of a number of systems available from Arlo Technologies, Inc. of Carlsbad, California. All or part of the circuitry and functionality of the base station 20 also could be incorporated into the gateway router 22, in which case the router 22 could be considered the base station.

Still referring to FIG. 2, each controlled module 14A-14n has circuitry 38 including a processor 40 and/or a non-transitory memory storage 42, and a wireless I/O communication device or radio 44 that communicates with the radio 30 of base station 20 and possibly other wireless input/output devices as well, such as those of the user device(s) 16 and the server 24. Each controlled module 14A-14n also may include any number of other devices performing sensing, monitoring, and/or communication operations. As one example, the controlled device 14A is an imaging device including a lens 50, a microphone 52 and a visible or infrared light 54. The internal circuitry 38 of imaging device 14A includes, in addition to the components discussed above, an imager 56, an audio circuit 58, and a media encoder 60. The imaging device 14A is configured to acquire data and to transmit it to the base station 20 for further processing and/or transmission to the server 24 and/or the user device 16. The acquired data typically will correspond to a video image, and the imaging device 14A may be or include a camera such as a video camera. Several such imaging devices may be mounted around a building or other structure or area being monitored. For example, in the case of a residential home, imaging devices could be mounted by each entrance and selected windows, and even on a gate or light pole. An imaging device also could be incorporated into or coupled to a controlled module in the form of a doorbell, a floodlight, etc.

As another example, controlled module 14n may be a monitor such as smoke detector. As with the other controlled modules, monitor 14n has internal circuitry 38 including a processor 40, memory 42, and an input/output device or radio 44. Controlled module 14n additionally has a sensor 70 an audio alarm 72, and a light 74 that may serve as a visual alarm. In the present embodiment in which the monitor is smoke detector, sensor 70 could detect smoke or $CO_2$.

Still referring to FIG. 2, the server 24 can include or be coupled to a microprocessor, a microcontroller or another programmable logic element (individually and collectively considered "a controller") configured to execute a program stored in a non-transitory memory such as a computer hard drive. This controller could be contained in whole or in part in the base station 20 (or the router 22 if the router 22 serves as a base station) or the server 24. The program comprises one, and more typically multiple, computer-implemented routines that execute specified functions. Alternatively, interconnected aspects of the controller and the program executed by it could be distributed in various permutations within the controlled modules 14A-14n, the base station 20, the user device 16, and/or the server 24.

Regardless of the controller configuration, the program may be utilized in filtering, processing, categorizing, storing, recalling, and transmitting data received from the controlled module 14A-14n via the base station 20. If at least one of the controlled modules is an imaging device, the controller may also be in communication with or include a computer vision program ("CV"), which can apply one or more filters or processes, such as edge detection, facial recognition, motion detection, etc., to detected one or more characteristics of the recording such as, but not limited to, identifying an individual, animal, vehicle, or package present in the recording. The controller also could be in communication with a private or public emergency service provider such as an ambulance service, police service, or fire department. The controller also could communicate with third party user devices, such as those of trusted friends or relatives.

In operation of a controlled module in the form of a monitoring device such as an imaging device 14A or a monitor 14n such as a, each controlled module 14A-14n can be configured, through suitable mounting of the module and/or through suitable manipulation of its controls, to monitor an area of interest; such as a part of a building or section of property. In the case of the controlled module being an imaging device 14A, the imaging device may capture an image upon receipt of a command from a monitoring device 16. An image also may be captured automatically upon detection of a triggering event by a detector. The triggering event may be motion of a triggering object and the detector may be a motion detector. Instead of or in addition to detecting motion, the detector could also include an infrared (IR) sensor detecting heat, such as the body heat of an animal or person. Whether camera operation is triggered by a command from a monitoring device 14A or by detection of a triggering event, the camera can then capture a raw video stream which, in turn, can be provided to the media encoder 60 for producing video packets in an encoded video stream. The stream is at least conceptually formed of a number of sequentially-captured frames of the monitored area. Similarly, the microphone 52 and the audio circuit 58 can capture a raw audio stream which, in turn, can be provided to the media encoder 60 for producing audio packets in an encoded audio stream. Accordingly, the video and/or audio packets, referred to herein as "media" packets, are provided in an encoded media stream. Under control of the controller executing the program, the encoded media stream can be transmitted from the wireless I/O communication device 44 to the base station 20.

The media stream may then be transmitted via the WAN to a remote data storage device within and/or in communication with server 24 for data storage and processing. The storage device may be a cloud-based storage device, and the server 24 may be a cloud server accessible via a wireless connection. A CV may apply one or more filters or processes, such as edge detection, facial recognition, motion detection, etc., to detect one or more characteristics of the recording such as, but not limited to, identifying an individual, animal, vehicle, or package present in the recording. A filtered or otherwise processed image can then be displayed on the user device 16, along with additional visual and/or audio messaging such as a text and/or audio message identifying a generic or particular person or object. The image can be transmitted in the form of frames corresponding to or derived from (via filtering and other processing) the frames transmitted by the imaging device 14A in the media packets. Alternately, as mentioned above, data storage and processing functions could be performed in combinations of the imaging device 14A, the base station 20, and even the user device 16.

In the case of the controlled module being a smoke detector, the triggering event could be the detection of smoke or a component of smoke, such as $CO_2$, above a designated threshold. Then, the processed data may be transmitted via the WAN to a remote data storage device in communication with server 24 for data storage and additional processing. The controller then can generate a push notification ("PN") or other alert or notification and send it to one or more user devices 16 to indicate occurrence of the triggering event.

Referring again to FIG. 1, the user device 16 is configured such to operate in one of two or more modes, selected ether manually or upon occurrence of a triggering event. Each mode has specific, possibly customizable, displays and controls associated therewith. In the illustrated embodiment in which the user device 16 is a smart phone or tablet computer, a program stored at least in part in the user device 16 operates such that the user device 16 can operate in either 1) a master-controller or single-user mode, or 2) a panel mode, otherwise considered a kiosk mode or a multi-user mode. When configured to operate in the master-controller mode, the device 16 is configured to exhibit displays or functionalities typically associated with hand-held smart phones and similar user devices when setting up, reconfiguring, or controlling a smart home system or its components. When configured to operate in the panel mode, the user device is configured to visually and functionally mimic a wall-mounted or other stationary control panel of a smart security system or similar smart home system. A user device 16 operating in panel mode may, for example, be mounted on a wall as illustrated in FIG. 1 or supported on a table or counter. It also could be hand-held.

In one configuration, the user device operating in panel mode will have reduced functionality and/or simplified graphics arranged differently than when operating in master-controller mode. This is because the user device is configured to emulate a typical wall-mounted control panel when operating in a panel mode, whereas the same device may be configured to be hand-held and to serve as a primary user interface for monitoring and other control operations when operating in the master-controller mode. In the case of a home security system, the functionality of a user device configured to operate in panel may be limited to "low-security" functions such as system arming and disarming, controlling lights, etc. The user device 16 may also have reduced power or a more aggressive sleep mode setting when operating in panel mode. The same user device operating in master-controller mode also could have the same ability to arm or disarm a system as in the panel mode, as well additional abilities such as receiving notifications such as push notifications, permitting the user to alter the nature and type of notifications sent to the hand-held user devices, permitting the user to view archived still images or videos transmitted by imaging devices of the system, and/or the ability to select/deselect specific controlled modules for operation and/or functionalities of the controlled modules. The control device 16 operating in master-controller mode may also imbue the user with security access that is not available when the device operates in panel mode. Security functions that may be performed only when operating the device in master-controller mode may include setting passwords or passcodes, setting access levels for various personnel, and locking operation of the user device in panel mode.

The program may be configured such that the user device also has different, but not necessarily reduced, functionalities when operating in panel mode. For example, the user device 16 may be designed to interface with one or more of the controlled modules 14A-14n to always monitor for smoke detection, specified audio events, or specified visual events when the device 16 is operating in panel mode but to listen for such events only under specified conditions when device is operating in master-controller mode. The user device 16 also may be configured to always listen to voice commands when operating in the panel mode but to listen for such commands in the master-controller mode only when prompted to do so, such as by accessing an app on the user device 16.

Figure 3A:
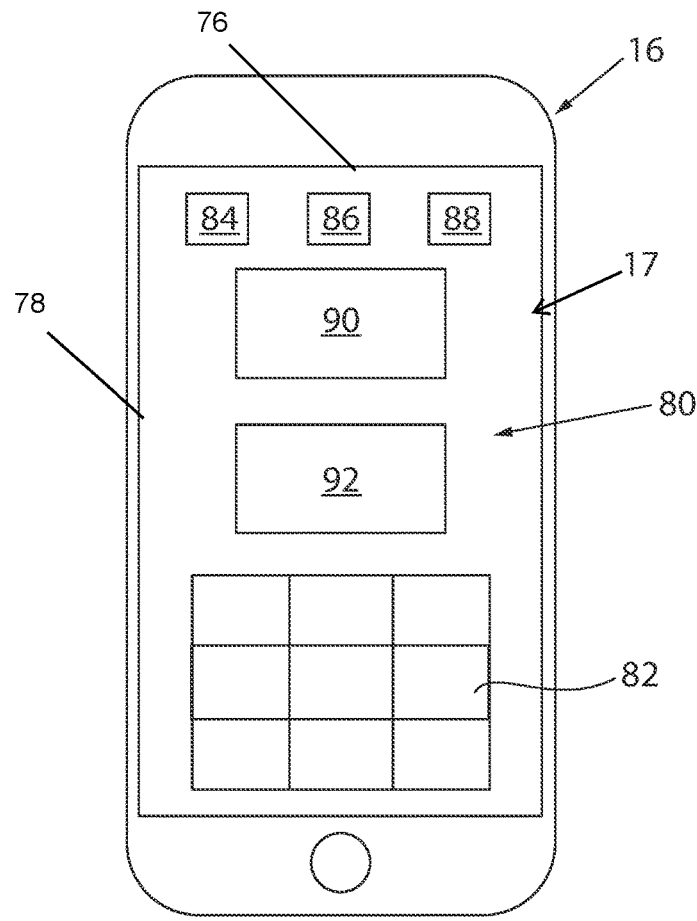
FIGS. 3A and 3B schematically show a user device configured for operation in first and second interface modes in accordance with the present invention.
Figure 3B:
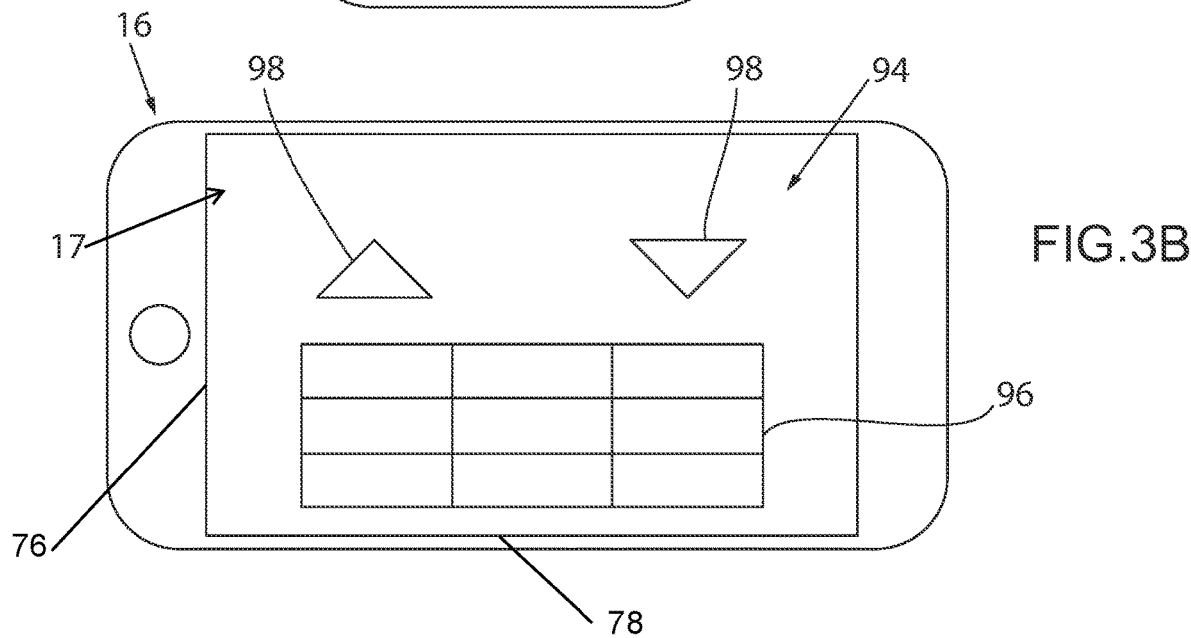

Turning now to FIGS. 3A and 3B, a user device 16 is shown with its displays on associated with master-controller mode and panel mode, respectfully. As is typical with smart phones and tablets, the device 16 has a display that is at least generally in rectangular in shape with the screen 17 having first and second opposed shorter or "minor" edges 76 having a relatively short dimension "x" and third and fourth longer or "major" edges 78 having a relatively long dimension "y" providing an aspect ratio y:x of from 4:3 to 19.5:9. The device 16 is shown in a portrait orientation in FIG. 3A with the major display edges 78 extending vertically and in landscape orientation in FIG. 3B with the major longer display edges 78 extending horizontally. The controller executes a program to display graphics in portrait orientation when the user device 16 is operating in master-controller mode and in landscape orientation when the user device 16 is operating in panel mode. Information thus extends along the y dimension of the screen 17 when the user device 16 is operating in panel mode and in the x direction when the user device 16 is operating in master-controller mode. The user may select operation in either master-controller mode or panel mode using an initial or default GUI on the screen 17.

The information displayed when the device 16 is operating in the master-controller mode may be arranged in a manner that assumes the user is holding it close range, i.e. within 1-2 feet of the user's face, with the authorization for full access to the system's 12 capability and controls. The GUI elements 80 that are displayed at this time may be relatively small, intricate, and detailed in nature and relatively large in number. These GUI elements 80 may, for example, include a keypad 82 which can used to remotely arm or disarm the system. Other possible graphical elements include, but are not limited to, an icon 84 for controlling display settings, an icon 86 for changing settings of the controlled modules 14A-14n, an icon 88 for setting or changing security settings, an icon 90 or indicia for accessing a video or still frame archival library, and other icons, symbols, or other graphical elements, collectively denoted 92 in FIG. 3A, for performing other control functions and/or for displaying the status of an aspect of the system. A push notification display (now shown) also may be enabled. Many of these graphical elements typically serve as user interfaces for applications. Upon being selected, one or more of these interfaces may serve as a drop-down menu providing access to other interfaces providing additional control/or input. For example, touching the display setting icon 84 may result in the display of symbols such as arrows permitting changing the volume and/or brightness of the screen 17 or the volume of the microphone. Touching the icon 86 could result in the display of numerous icons, each associated with one of the controlled modules 14A-14n. Selection of one of these icons could result in the display of yet another interface permitting selection of various controlled module settings.

In contract, the GUI elements 94 displayed on the screen 17 when the user device 16 is in the panel mode of FIG. 3B may be arranged in a manner that assumes that the user device 16 is located at something approaching arm's length (on the order of 2-3 feet from the user's face) with a limited ability to interact with the system 12. The displayed symbols, icons, or other graphical elements forming the GUI elements 94 may be relatively large and simple in appearance, and/or be relatively few in number. These GUI interface elements may, for example, include a keypad 96 for arming or disarming the system 12 and arrows 98 for increasing or decreasing lighting settings.

Figure 4:
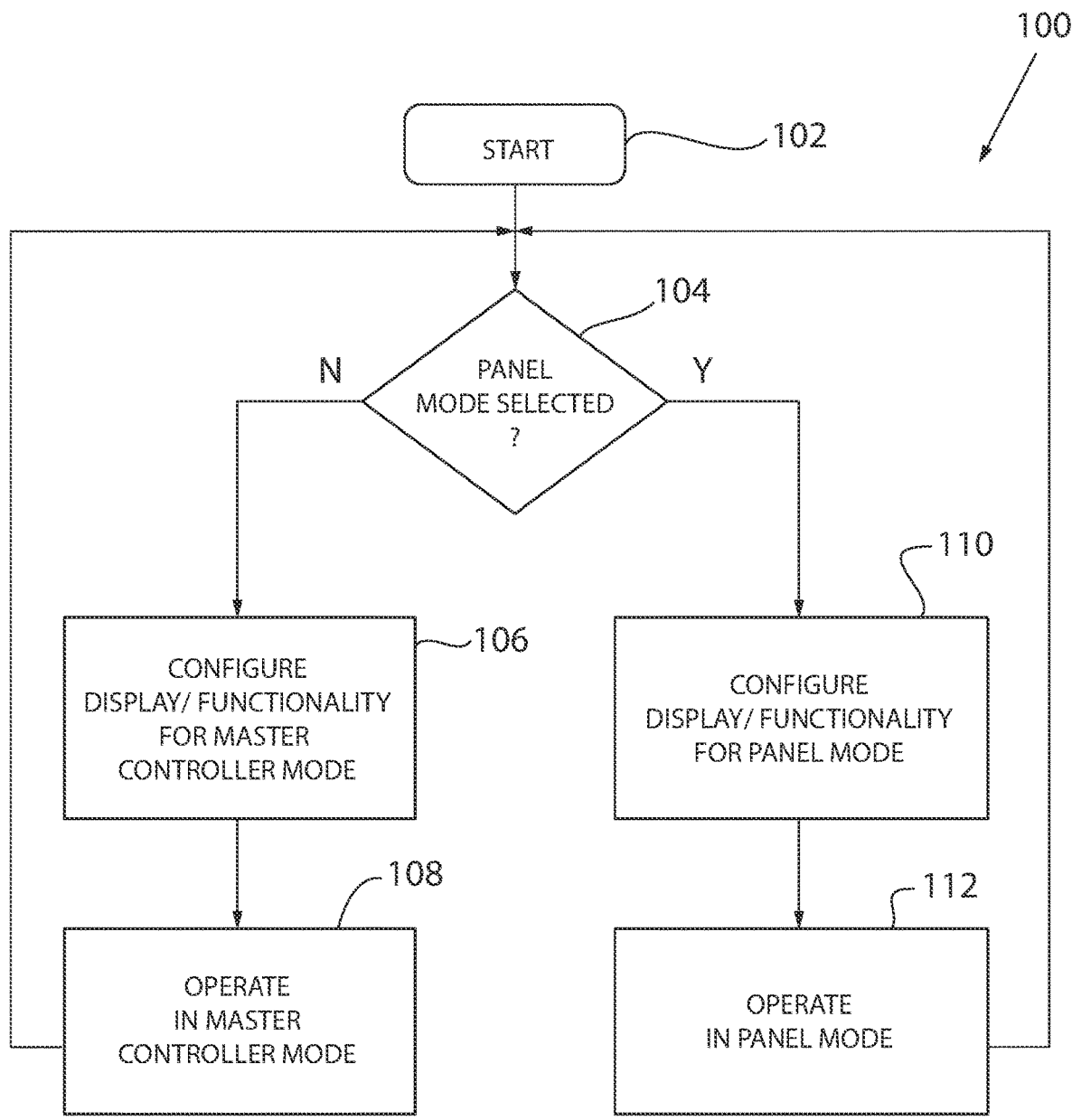
FIG. 4 is a flowchart illustrating the operation of the user device in the interface modes shown in FIGS. 3A and 3B.

A non-limiting example of multi-mode operation of the smart home system 12 now will described with reference to FIG. 4. The process 100 shown in that figure proceeds from START in block 102 to inquiry block 104, where it is determined whether or not the panel or multi-user mode of operation of the user device 16 has been selected. This determination could take any of a number of non-mutually exclusive forms. For example, upon initially accessing a control app for system 12 on the screen 17 of user device 16, a GUI may prompt the user to select an operating mode or may default to the single-user or master-controller mode with the option of then selecting multi-user or panel mode, possibly coupled with the requirement to enter a passcode or otherwise demonstrate an appropriate security clearance for switching between modes. Alternatively, selection could occur automatically upon, for example, 1) detection of the user device being positioned in or rotating to a specific orientation such as a landscape or portrait orientation, 2) detection of the user device being plugged into or otherwise interfacing with a wall or table mount, and/or 3) detection by a controlled module 14A-n of a specific triggering event, such as the detection of an unrecognized individual accessing the user device.

If it is determined in block 104 that panel mode is not selected, the process 100 proceeds to block 106, where a program or application in the device 16, possibly communicating with the base station 20 and/or the external server 24, configures the device 16 for operation in master-controller mode. Graphical elements will be displayed on the screen 17 having graphical elements arranged in the nature and number discussed above in conjunction with FIG. 3A. The process 100 then proceeds to block 108, where the GUI 84 provides the user with full access to the functionality of the system 12. As mentioned above, this access may permit a wide variety of controls and displays.

If the answer to the inquiry of the block 104 is YES, indicating selection of the panel mode, the process 100 proceeds to block 110, where an application or program in the device 16, possibly communicating with the base station 20 and/or external server 24, configures the user device 16 for operation in panel r mode in which the device 16 mimics a control panel of a home security system or similar smart system. A GUI 94 then will be displayed on the screen 17 having graphical elements arranged as discussed above in conjunction with FIG. 3B, with those GUI elements 94 typically being fewer in number and/or less intricate than those displayed when the user device 16 is operating in master-controller mode. The functions associated with the GUI 94 may be limited to a few functions such as system arming and disarming, the control of lights, etc. The user device 16 may also have reduced power or a more aggressive sleep mode setting when operating in this mode. As mentioned above, the user device 16 also may operate differently in the panel mode in other ways, such as always monitoring for smoke, motion, or noise or by having different power, sleep, and motion response settings.

It can thus be seen that enabling a smart phone, computer tablet, or similar user device of the type typically used to provide control access to a smart home system to operate in a panel mode eliminates the need to supply a dedicated control panel with the smart home system. This elimination negates the need to manufacture and program expensive specialized devices and provides enhanced versatility of the system's controls.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

What is claimed is:

1. A method of controlling a smart home system having at least one controlled module for monitoring an area of interest, the at least one controlled module being in wireless communication with a user device, the method comprising:
    selecting one of first and second operating modes of the user device;
    in response to selecting the first operating mode, configuring the user device to display a first arrangement of graphical elements for allowing a user to enter instructions for configuring at least one monitoring operation to be performed by the at least one controlled module to monitor the area of interest and to view a status of an aspect of the at least one controlled module; and
    in response to selecting the second operating mode, configuring the user device to display a second, alternate arrangement of graphical elements for allowing a user to enter instructions for configuring at least one monitoring operation to be performed by the at least one controlled module to monitor the area of interest and to view at least one of a notification received by the user device, a still image received by the user device from the at least one controlled module, and a video received by the user device from the at least one controlled module.

2. The method of claim 1, wherein the first operating mode is a master-controller mode and the second operating mode is a panel mode, and wherein the user device displays a greater number of graphical elements and has, at least in some respects, enhanced functionality when operating in the master-controller mode than when operating in the panel mode.

3. The method of claim 2, wherein, when operating in the panel mode, the user device has, when compared to operation in the master-controller mode,
    1) no or reduced ability to permit the user to change security settings,
    2) reduced or barred control access to one or more controlled modules,
    3) different display power and/or sleep settings, and/or
    4) different monitoring characteristics.

4. The method of claim 2, wherein, when operating in the panel mode but not when operating in master-controller mode, the user device always monitors for the detection of smoke, motion, and/or sound by a controlled module.

5. The method of claim 1, wherein the selection between the first operating mode and the second operating mode is performed manually by entering a command on the user device.

6. The method of claim 1, wherein the selection between the first operating mode and the second operating mode is performed automatically upon occurrence of a triggering event.

7. The method of claim 6, wherein the triggering event comprises detection of the user device being positioned in or rotating to a specified orientation, detection of the user device being plugged into or otherwise interfacing with a wall or table mount, and/or detection by a controlled module of a specific event.

8. The method of claim 1, wherein the user device is a smart phone or computer tablet having a touch screen on which graphics can be displayed, and wherein the graphics are displayed in portrait orientation when the user device is configured to operate in the first mode and in landscape orientation when the user device is configured to operate in the second mode.

9. The method of claim 1, wherein the controlled module is an imaging device having a camera.

10. A smart home system comprising:
    (A) at least one controlled module capable of performing monitoring an area of interest and/or controlling functions of a controlled device in the area of interest; and
    (B) a controller that is in communication with the controlled module and a user device and that executes a program, stored in a non-transitory memory, to:
        in response to selection of a first operating mode of the user device, configure the user device to display a first arrangement of graphical elements for allowing a user to enter instructions for configuring at least one monitoring operation to be performed by the at least one controlled module to monitor the area of interest and/or controlling the functions of the controlled device in the area of interest by the at least one controlled module and to view a status of an aspect of the at least one controlled module, and
        in response to selection of a second operating mode of the user device, configure the user device to display a second, alternate arrangement of graphical elements for allowing a user to enter instructions for configuring at least one monitoring operation to be performed by the at least one controlled module to monitor the area of interest and/or controlling the functions of the controlled device in the area of interest by the at least one controlled module and to view at least one of a notification received by the user device, a still image received by the user device from the at least one controlled module, and a video received by the user device from the at least one controlled module.

11. The smart home system of claim 10, wherein the first mode is a master-controller mode and the second mode is a panel mode, and wherein the controller is configured to execute the program to cause the user device to display a greater number of graphical elements and to have enhanced functionality when operating in the master-controller mode than when operating in the panel mode.

12. The smart home system of claim 11, wherein the controller is configured to execute the program to cause the user device, when operating in the panel mode, to have, when compared to operation in the master-controller mode,
1) no or reduced ability to permit the user to change security settings,
2) reduced or barred control access to one or more controlled modules,
3) different display power and/or sleep settings, and/or
4) different monitoring characteristics.

13. The smart home system of claim 11, wherein the controller is configured to execute the program to cause the user device to, when operating in the panel mode but not when operating in master-controller mode, always monitor for the detection of smoke, motion, and/or sound by a controlled module.

14. The smart home system of claim 10, wherein the controller is configured to execute the program to display graphics on a display of the user device in portrait orientation when the user device is configured to operate in the first mode and in landscape orientation when the user device is configured to operate in the second mode.

15. The smart home system of claim 10, further comprising a base hub in wireless communication with the controlled module and with a wide area network (WAN).

16. The smart home system of claim 10, wherein the smart home system is a smart security system, and wherein the controlled module is an imaging device having a camera.

17. A smart security system, comprising:
a plurality of controlled modules, at least one of the controlled modules being an imaging device having a camera;
a base station in wireless communication with the controlled modules and with a wide area network (WAN); and
a controller in operative communication with a user device and with the base station and/or the controlled modules, wherein
the controller executes a program, stored in a non-transitory memory, to:
in response to selecting a master-controller operating mode of the user device, configure the user device to display a first arrangement of graphical elements for allowing a user to enter instructions for configuring the imaging device and to view a status of an aspect of the at least one controlled module, the graphical elements arranged in a portrait orientation of a touch screen of the user device, and
in response to selecting a panel operating mode of the user device, configure the user device to display a second, alternate arrangement of graphical elements for allowing a user to enter instructions for configuring the imaging device and to view at least one of a notification received by the user device, a still image received by the user device from the at least one controlled module, and a video received by the user device from the at least one controlled module, the alternate arrangement of graphical elements arranged in a landscape orientation of the touch screen of the user device, and wherein
the controller is configured to execute the program to cause the user device to display a greater number of graphical elements and to have enhanced functionality when operating in the master-controller mode compared to when operating in the panel mode.

18. The smart security system of claim 17, wherein the controller is configured to execute the program to cause the user device, when operating in the panel mode, to have, when compared to operation in the master-controller mode,
1) no or reduced ability to permit the user to change security settings,
2) reduced or barred control access to one or more controlled modules,
3) different display power and/or sleep settings, and/or
4) different monitoring characteristics.

19. The smart security system of claim 17, wherein the controller is configured to execute the program to display graphics on a display of the user device in portrait orientation when the user device is configured to operate in the first mode and in landscape orientation when the user device is configured to operate in the second mode.

* * * * *